United States Patent [19]
Oksanen et al.

[11] Patent Number: 5,918,170
[45] Date of Patent: Jun. 29, 1999

[54] SYNCHRONIZING RADIO TELEPHONE TO RECEIVE EVERY NTH OVERHEAD MESSAGE TRAIN

[75] Inventors: Markku Tapio Oksanen, Salo, Finland; Juha Peranto, Irving, Tex.

[73] Assignee: Nokia Mobile Phones Limited, Salo, Finland

[21] Appl. No.: 08/689,734

[22] Filed: Aug. 13, 1996

[51] Int. Cl.$^6$ ................................ H04B 1/40; H04J 3/16
[52] U.S. Cl. .................... 455/343; 455/434; 455/502; 455/515; 370/311
[58] Field of Search ................................ 455/38.3, 343, 455/434, 502, 503, 515, 228, 231; 340/825.44; 370/311, 314, 321, 337, 347

[56] References Cited

U.S. PATENT DOCUMENTS

| | | | |
|---|---|---|---|
| 4,519,068 | 5/1985 | Krebs et al. | 455/502 |
| 5,150,954 | 9/1992 | Hoff | 340/825.44 |
| 5,257,257 | 10/1993 | Chen et al. | |
| 5,471,655 | 11/1995 | Kivari | |
| 5,511,110 | 4/1996 | Drucker | |
| 5,604,744 | 2/1997 | Andersson et al. | 370/347 |
| 5,649,315 | 7/1997 | Eaton | 455/343 |

OTHER PUBLICATIONS

PN 3476 Ballot Version, pp. 52, 54, 157, Jul. 20, 1995.

*Primary Examiner*—Reinhard J. Eisenzopf
*Assistant Examiner*—Lester G. Kincaid
*Attorney, Agent, or Firm*—Perman & Green, LLP

[57] ABSTRACT

A method for operating a cellular communications network includes the steps of (a) providing a set of mobile stations that are capable of operating in an idle/sleep mode of operation; (b) transmitting a forward control channel to the set of mobile stations, the forward control channel being organized as a frame structure that is continuously repeated, wherein each frame structure includes an overhead information portion and a plurality of paging information portions; and (c) operating the set of mobile stations to all receive the overhead information portion from every nth frame structure and to receive an assigned one of the paging information portions from every frame structure, wherein n is an integer that is greater than one. The value of n may be fixed or may be made variable. In a presently preferred embodiment of this invention n is equal to six. The method further includes a step of placing individual ones of the set of mobile stations into a low power mode of operation when not receiving the overhead information and paging information portions. In a presently preferred embodiment of this invention the overhead information portion includes at least a system parameter overhead message and may include other overhead messages.

16 Claims, 3 Drawing Sheets

SYNCHRONIZING RADIO TELEPHONE TO RECEIVE EVERY NTH OVERHEAD MESSAGE TRAIN

FIELD OF THE INVENTION

This invention relates generally to radiotelephones and, in particular, to radiotelephones or mobile stations such as those capable of operation with a cellular network.

BACKGROUND OF THE INVENTION

In that many radiotelephones are battery powered devices, an important consideration is in maximizing the operating time of the radiotelephone between required battery rechargings. This can be accomplished in part by periodically placing the radiotelephone, hereinafter referred to as a mobile station, into a sleep state. When in the sleep state a significant portion of the mobile station's circuitry is either powered off completely, or is operated at a reduced power level. Since the RF receiver, transmitter and related circuits consume a significant amount of power, it is desirable to especially power these components down or off. However, when the receiver circuitry is powered down or off the mobile station is temporarily disconnected from the cellular network. As such, it is important to insure that, when in the sleep mode, the mobile station does not miss any messages and/or control information that is required by the mobile station.

Reference can be had to commonly assigned U.S. Pat. No. 5,471,655, issued Nov. 28, 1995, entitled "Method and Apparatus for Operating a Radiotelephone in an Extended Stand-by Mode of Operation for Conserving Battery Power", by Raimo Kivari, for teaching various embodiments of a mobile station that is operated in a low power, discontinuous reception mode of operation.

Referring to FIG. 4, it has been proposed for EIA/TIA IS-91-A (i.e., analog (FM) mobile stations) to provide the illustrated forward control channel frame configuration to support the sleep mode. The basic idea of this proposal is to divide the control messages, which are transmitted to the mobile stations operating in idle sleep mode, into eight paging slots. A mobile station operating in idle sleep mode wakes at the beginning of its assigned paging slot to receive any control messages addressed to it, the paging slot being determined by the mobile station's telephone number. The mobile station goes back to sleep when it receives a control-filler message. As such, the wake up time (the period for receiving mobile station control messages) can be longer than the paging slot shown in FIG. 4. Additionally, the mobile station must wake periodically to listen to overhead messages, which are transmitted for all mobile stations listening to the same base station.

In this proposal the forward control channels (i.e., base station to mobile station) are configured for sleep mode by being organized in the illustrated frame format. The illustrated configuration must be used if a Registration Increment Global Action Message is sent on this control channel with an Idle Speep Mode (ISM) field set to '1' (see IS-91-A, Section 3.7.1.2.2). The ISM field in the Registration Increment Global Action Message indicates whether the mobile station can operate on the idle sleep mode on the control channel currently being monitored. Each word in the frame consists of the dotting pattern, word synchronization, busy/idle bits, and five repeats each of the stream A and stream B message words.

The proposed organization of the forward control channel for support of sleep mode is as follows. Each frame in stream A and B consists of 23 word positions. Any otherwise unfilled word positions are occupied with a control-filler message (see IS-91-A, Section 3.7.2.4). The first two words (word positions 0 and 1) of each channel frame are always the two words of the system parameter overhead message (see IS-91-A, Section 3.7.1.2.1). Up to five global action overhead messages (see IS-91-A, Section 3.7.1.2.2) and/or the registration ID message (see IS-91-A, Section 3.7.1.2.3) and/or other messages are sent sequentially in the next words within the frame, beginning with word position 2.

The mobile station listens to either stream A or stream B messages depending on the last bit of its telephone number. The AMPS/NAMPS related explanations in this patent application exclude, for simplicity, the messages of the stream not meant for the mobile station.

Mobile station control messages (see IS-91-A, Section 3.7.1.1) that are directed to mobile stations not operating in an idle task, and/or those mobile stations that were sent, within the preceding four seconds, an Awake Hold order (see IS-91-A, Table 3.7.1.1-1) may be placed in any of the word positions 7–23, or in any of the word positions 2–6 not occupied by messages that are part of the overhead message train (OMT). Mobile control messages are specified to not extend into the next forward control channel frame.

However, a problem is created by this proposed technique in that different mobile stations are operated so as to receive different ones of the OMTs and, as such, unless the same information is transmitted in several OMTs, some mobile stations may miss important information.

OBJECTS OF THE INVENTION

It is thus a first object of this invention to provide an improved method for operating a mobile station in a sleep mode.

It is another object of this invention provide an improved mobile station that is operated in a sleep mode and that receives, in synchronism with other mobile stations, predetermined ones of a repeating sequence of overhead messages from a cellular network.

It is a further object of this invention to provide a technique for a cellular system operator to transmit some overhead messages less often, thereby maintaining a high paging capacity even though some mobile stations operate in a sleep mode.

SUMMARY OF THE INVENTION

The foregoing and other problems are overcome and the objects of the invention are realized by methods and apparatus in accordance with embodiments of this invention.

A method is disclosed for operating a cellular communications network, and includes the steps of (a) providing a set of mobile stations that are capable of operating in a sleep mode of operation; (b) transmitting a forward control channel to the set of mobile stations, the forward control channel being organized as a frame structure that is continuously repeated, wherein each frame structure includes an overhead information portion and a plurality of paging information portions; and (c) operating the set of mobile stations to all receive the overhead information portion from every nth frame structure and to receive an assigned one of the paging information portions from every frame structure, wherein n is an integer that is greater than one. The value of n may be fixed or may be made variable. In a presently preferred embodiment of this invention n is equal to six.

The method further includes a step of placing individual ones of the set of mobile stations into a low power mode of operation when not receiving the overhead information and paging information portions.

In a presently preferred embodiment of this invention the overhead information portion includes at least a system parameter overhead message (SPOM), and every sixth overhead information portion has additionally a registration increment global action overhead message (GAOM), with an ISM field set to "1".

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
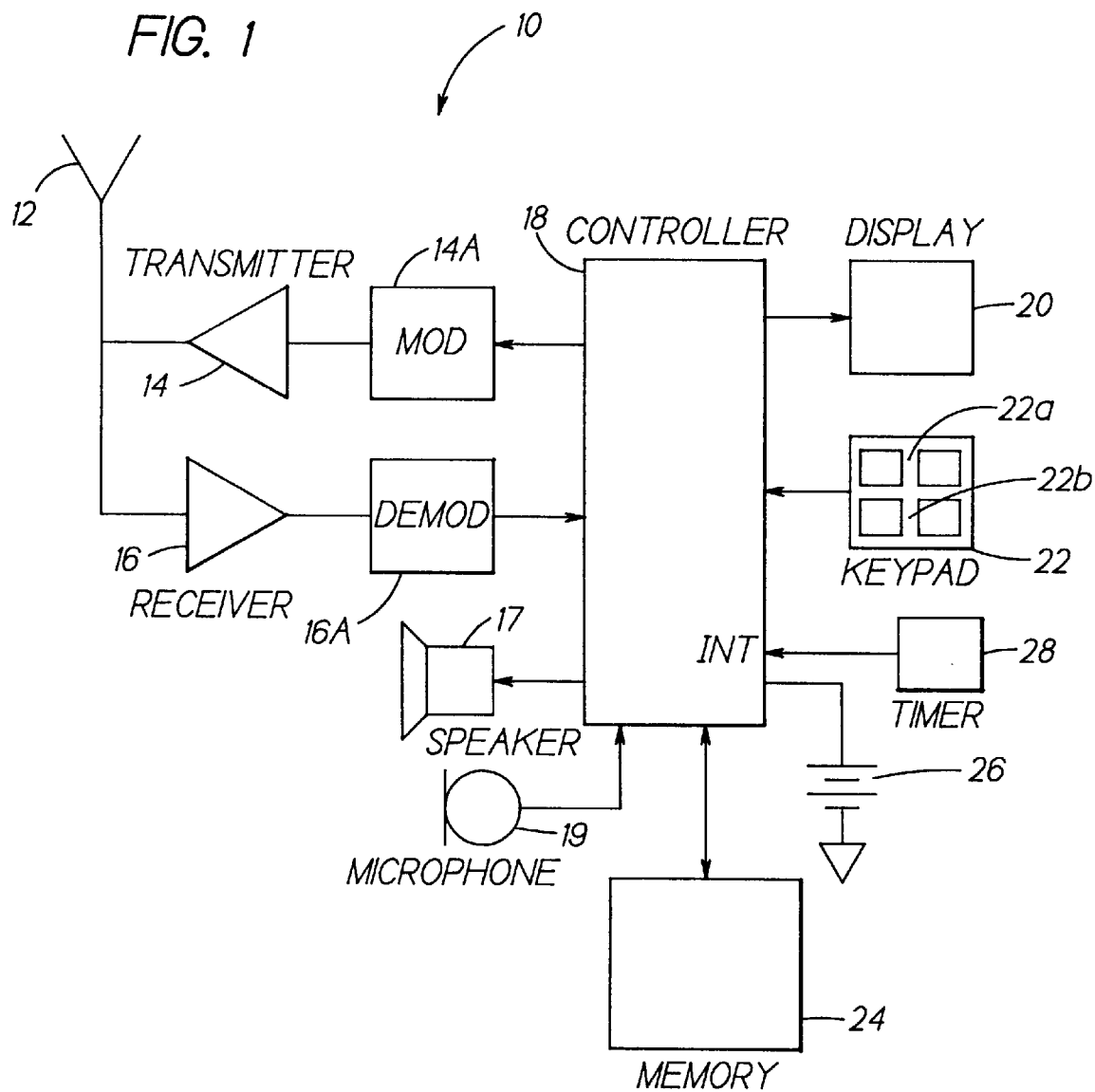
FIG. 1 is a block diagram of a mobile station that is constructed and operated in accordance with this invention.
Figure 2:
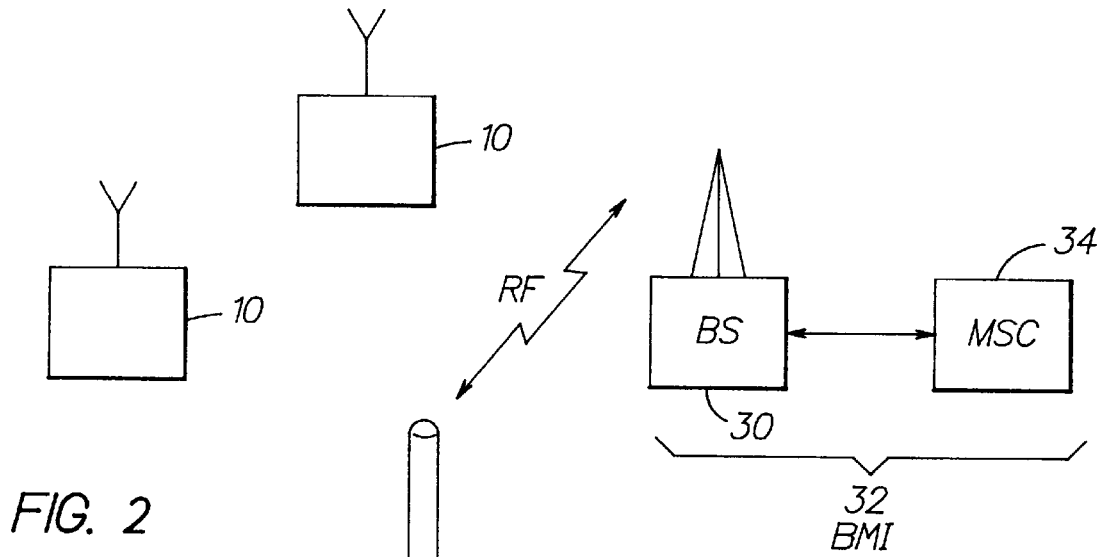
FIG. 2 is an elevational view of the mobile station shown in FIG. 1, and which further illustrates a cellular communication system to which a plurality of the mobile stations are bidirectionally coupled through wireless RF links.
Figure 2:
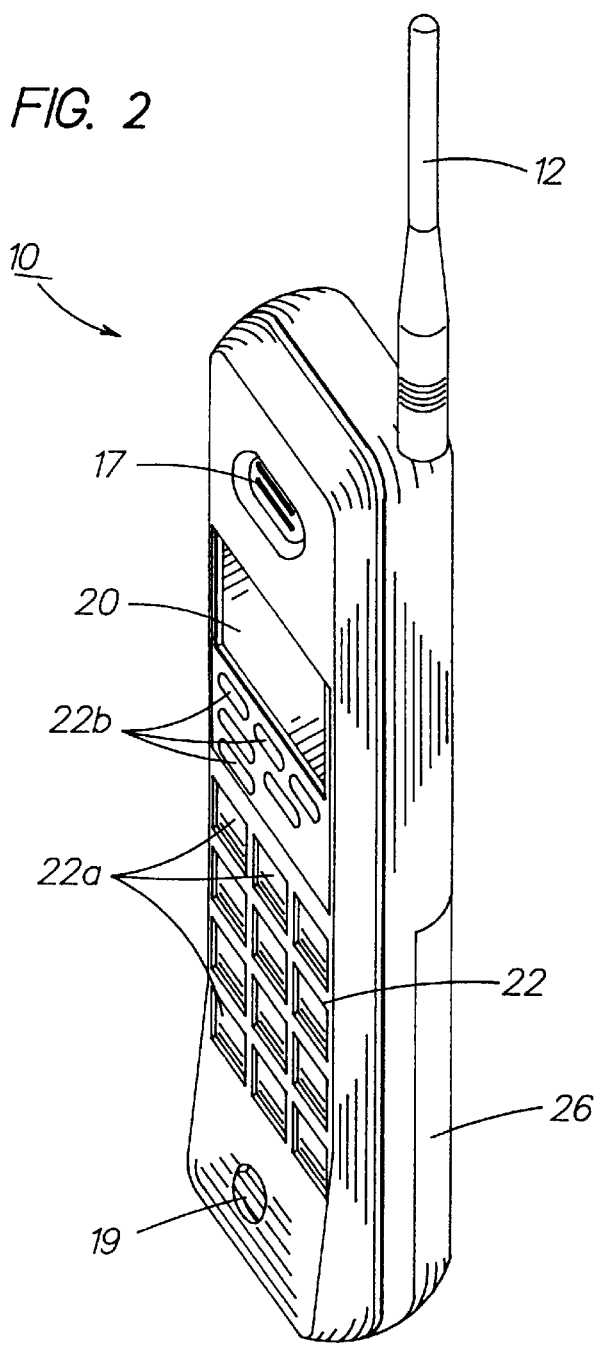

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising a base station/mobile switching center/internetworking function, or BMI 32, that includes a Mobile Switching Center (MSC) 34. The MSC 34 provides a connection to landline trunks for making calls to, and receiving calls from, the landline network. The BMI 32 is associated with a particular service provider.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical forward control channel frame structure of a type that was described above with reference to FIG. 4, although the teaching of this invention is not intended to be limited only to this specific structure, or for use only with an IS-91-A compatible mobile station.

A user interface includes a conventional earphone or speaker 17, a conventional microphone 19, a display 20, and a user input device, typically a keypad 22, all of which are coupled to the controller 18. It is understood that the controller 18 includes the circuitry for implementing the audio and logic functions of the mobile station 10. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The operating program in the memory 24 includes routines to implement the method described below in relation to FIG. 3.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides or in addition to IS-91-A (AMPS and NAMPS), such as IS-136, GSM and IS-95 (CDMA). TACS mobile stations may also benefit from the teaching of this invention. It should thus be clear that the teaching of this invention is not to be construed to be limited to any one particular type of mobile station or air interface standard.

Figure 4:
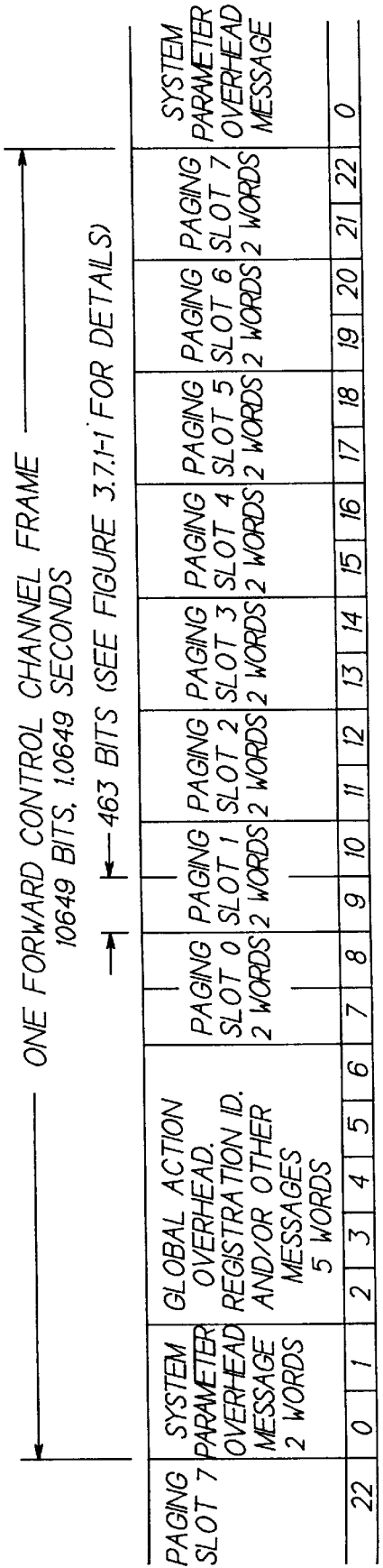
FIG. 4 illustrates a forward control channel frame configuration that has been proposed in the prior art.

In this embodiment of the invention the mobile station 10 further includes a timer 28 which is programmable by the controller 18, and which then subsequently generates an interrupt for causing the controller 18 to exit a low power sleep mode of operation. At this time the controller 18 functions to restore operating power to all or at least a portion of the mobile station 10 in order to receive overhead information or paging information from the forward control channel. The overhead information portion conveys a system parameter overhead message (SPOM), and may convey global action overhead messages (GAOM), registration ID, and/or other messages as depicted in FIG. 4. The paging information portion may include a control message addressed to the mobile station 10. If no action is required by the mobile station 10, the controller 18 then places the receive circuitry back into the mode of low power consumption, reprograms the timer 28 for a duration of a next sleep period, and then itself enters the sleep mode.

The sleep mode can be realized in several ways. In one example, the controller 18 only turns off portions of the receiver 16 and/or turns off a frequency synthesizer (a frequency synthesizer is one common technique for generating a local oscillator signal for the receiver 16). As was mentioned above, the controller 18 can also be placed in the sleep mode. In general, the "deeper" the sleep the better is the desired saving in power consumption. One consideration is that, as more circuitry is powered off, the affected circuits must have sufficient time to settle after being re-powered in order to receive the message from control channel. Furthermore, and for the case where the controller 18 is placed into the sleep mode, some circuitry should be provided to wake up the controller when, by example, the user dials numbers from the keypad 22.

Circuits and controllers for implementing such powered down, or sleep mode functions, are known in the art, and will not be discussed in further detail.

Before further describing the invention in further detail, it is noted that in this patent application a reference to an "overhead information portio" is intended to mean messages sent to all mobile stations listening to a particular base station (i.e., in IS-91-A: an overhead message train). A reference to a "paging information portion" is intended to mean a message sent during the period that the mobile station is awake in the idle mode for receiving mobile station control messages (e.g., such as a page or an awake hold order in IS-91-A). It should be further noted that not all mobile station control messages must be sent in the "paging information portion", because certain messages are sent when the mobile station 10 is not in the idle mode, and thus not in the idle sleep mode. Exemplary messages of this type, in IS-91-A, are the registration confirmation and the initial voice channel designation. By example, assume that the mobile station 10 wakes at the beginning of an assigned paging slot for receiving a paging information portion. When the mobile station receives a page addressed to it, the mobile station transmits a page response to the base station. After transmitting the page response the mobile station does not go to the idle sleep mode, or to the idle mode. Instead, the mobile station 10 waits for an initial voice channel designation message from the base station. As such, it is not necessary to transmit this message in the paging information portion.

In IS-91-A, the beginning of the overhead information portion and the beginning of the paging information portion are fixed in the forward control channel frame structure. The overhead message portion can have a length of two to seven words, and the paging information portion continues until the receipt of a control-filler message. However, it should be realized that the teaching of this invention applies as well to systems wherein where the length of the overhead information portion and/or the length of the paging information portion is fixed.

Figure 3:
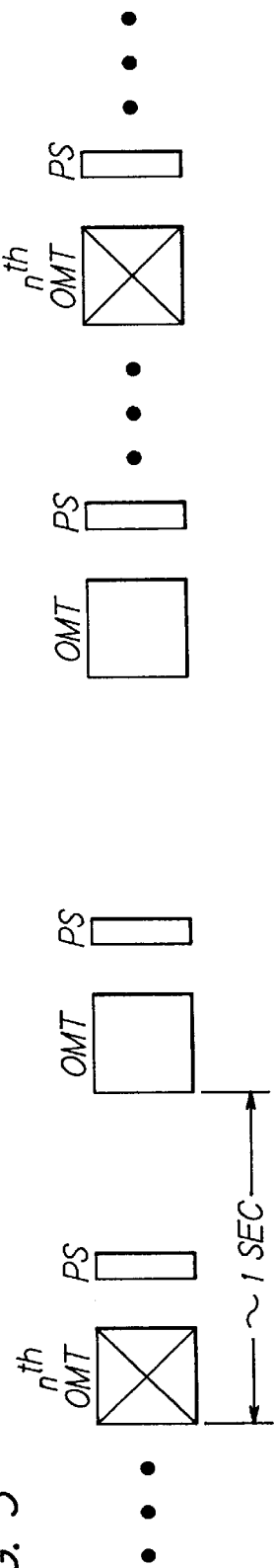
FIG. 3 illustrates, in accordance with a preferred embodiment of this invention, a forward control channel and the reception of predetermined ones of overhead message trains (OMTs) by the mobile stations of FIG. 2.

Reference is now made to FIG. 3 for illustrating a presently preferred embodiment of this invention. FIG. 3 shows a plurality of repeating overhead message trains (OMTs), each of which resembles or is identical to the slot 0 and 1 format shown in FIG. 4, and which may further include or be followed by the additional overhead information (e.g., registration increment GAOM) illustrated in slots 2–6 of FIG. 4. Each mobile station 10 equipped with the idle sleep mode feature is also assumed to be assigned a paging slot and to receive a paging information portion starting from the paging slot and ending with the receipt of a control-filler message.

In general, an OMT always includes a two word System Parameter Overhead Message (SPOM) and, in practice, the SPOMs repeat one after the other except for busy/idle bits. These bits can be "1" or "0" and are not repeats. The OMT can be simply a two word SPOM, or it can contain a third word such as registration increment GAOM, or third and fourth words such as a two word Random Challenge Global Action Overhead Message (GAOM), or more words up to seven words. Thus, the OMTs may not be repeated in the sense that identical OMTs follow one another in sequence. As such, the use of the term "repeating sequence" of OMTs or repeating sequence of overhead information portions should be read in the light of the foregoing explanation.

In accordance with this invention a set of all of the mobile stations 10 within a given cell, i.e., the mobile stations 10 that are communicating with the base station 30 of FIG. 2, and that are also capable of operating in the idle sleep mode of operation, are programmed to receive, when in the idle state, the same OMT, such as every sixth OMT, as indicated by the X placed within the first and last OMTs of FIG. 3. Each of these mobile stations thus programs the timer 28 to generate an interrupt a sufficient period of time before the occurrence of the sixth OMT (the mobile station's wake-up frame) so that the receiver 16 and other circuitry can be powered up and settled prior to receiving the sixth OMT. Each mobile station 10 also programs its timer 28, when in the idle state, so as to receive paging information portions starting from each assigned paging slot (once every approximately one second) and continuing until the receipt of a control-filler message.

It can thus be realized that the set of mobile stations 10 operate with a two level synchronization, wherein at one level each mobile station is synchronized to the forward control channel to receive the paging information portion (about once per second), and is further synchronized, with all other mobile stations of the set of mobile stations capable of operating in the sleep mode, to receive every nth OMT, where a suitable value of n is six (about once every six seconds).

Those mobile stations 10 that are not part of the idle sleep mode set of mobile stations may operate instead to receive every OMT and all mobile station control messages. By assigning the set of idle sleep mode mobile stations to receive only the same, predetermined ones of the OMTs, the BMI 32 is enabled to place all required overhead information (e.g., registration and access-related information) into the predetermined ones of the OMTs (e.g., every sixth OMT), thereby assuring that all mobile stations of the set of idle sleep mode mobile stations receive this information. Furthermore, the BMI 32 may use only integer multiples of the predetermined OMTs for this control information, such as every 2n, 3n, etc. OMT (e.g., every 12th, 18th, etc. OMT).

In accordance with an aspect of this invention, by sending this overhead information less often, more forward control channel capacity can be used for paging.

On the other hand, a "synchronization message" may be transmitted more often than in every n OMTs, for example, in every third OMT instead of every sixth OMT. In this case, when the mobile station first comes to the control channel, in many cases it will receive the synchronization message earlier (the 3rd OMT maximum) than when transmitting only in every n (6th OMT maximum). In this manner the mobile station may be placed in the sleep mode sooner when first coming to the channel, and the average power consumption is thereby reduced. In this case, the other overhead messages intended for the idle sleep mode mobile stations should be sent more often. For example, if the mobile stations are synchronized in two separate groups, the overhead messages for these mobile stations are sent twice as often as would be needed if all mobile stations were synchronized in one group.

It is also within the scope of this invention to make the value of 'n' a system-variable parameter which is broadcast to the mobile stations 10. By example, during one period of time the set of idle sleep mode mobile stations may synchronize to and receive every sixth OMT, while during another period of time the set of idle sleep mode mobile stations may synchronize to and receive every fourth OMT, or every tenth OMT, or every 15th OMT.

Because the synchronization message requires some portion of the limited length OMT, it may be useful to synchronize the mobile stations to receive other OXTs than those having the synchronization message. For example, to receive the OMT following the synchronization message. In this manner more useful overhead messages can be appended to the SPOM in those OMTs received by idle sleep mode mobile stations. The mobile station 10 may then receive the mth OMT after receiving the synchronization message, and would then synchronize to receive every nth OMT. The values of 'n' and 'm' can be predetermined and fixed, or one or both may be made variable. In the latter case the current value of n and/or m can be sent in a forward control channel message to the mobile station 10.

It can thus be appreciated that the teaching of this invention overcomes the problem where a mobile station can miss the reception of an overhead message required by the mobile station. This is especially true in the case where the overhead message is transmitted only once by the BMI 32. This is also true in the case where the overhead message is transmitted periodically (e.g. every mth OMT frame), wherein depending on the periodicity of the overhead message and the position of the mobile station's wake-up frame the mobile station may never receive and read the overhead message. By example, if a Random Challenge GAOM is transmitted every third OMT, and the mobile station's wake-up frame follows the frame in which the Random Challenge GAOM is transmitted, then the mobile station will never receive the Random Challenge GAOM. The teaching of this invention overcomes this problem by providing, in every nth (e.g., every sixth) OMT, a registration increment global action overhead message. This message contains information regarding the idle sleep mode. Every mobile station 10 of the set of idle sleep mode mobile stations synchronizes to the nth OMT. Every nth ONT frame is further provided with all necessary overhead messages, these messages being appended to the system parameter overhead message (SPOM). This technique overcomes the problem where the mobile station 10 could miss necessary overhead information.

It should be noted, as previously explained, that not every nth OMT need contain all overhead messages. That is, some of the overhead messages may be sent less often. In accordance with an aspect of this invention the system operator has knowledge of when all mobile stations are "awake" and able to receive overhead messages, that is, of which mobile stations operate in the idle sleep mode and which do not. As such, the system operator is enabled to send any necessary messages in any of the nth OMTs.

Each of the mobile stations of the set of mobile stations can be initially operated in a continuous reception mode until a first one of the OMTs is received, after which the mobile station 10, having identified that it has received an OMT wherein the BMI 32 has placed the required synchronization information, is then enabled, based on a fixed or variable value of n, to determine when the next OMT, which is meant for idle sleep mode mobile stations, will be received.

Although described in the context of preferred embodiments, it should be realized that a number of modifications to these teachings may occur to one skilled in the art. By example, the SPOM and other overhead messages need not occupy the first set of slots in the forward control channel frame, but could occur at other locations, such as in the middle or at the end of the frame.

Furthermore, it should be noted that although it is an object of this invention to provide a technique to synchronize the mobile stations to receive predetermined ones of the OMTs, the teaching of this invention does not prevent the system operator from distributing the mobile stations to receive the OMTs randomly. By example, if the mobile stations are directed to receive, by example, every sixth OMT, but the message used for synchronization (e.g., in IS-91-A: registration increment GAOM with the ISM bit set to "1") is transmitted in every fifth OMT, the end result is that the mobile stations will be receiving the OMTs randomly (i.e., not in synchronism). This is a result of the mobile stations coming to the channel randomly, and thus receiving the first synchronization message randomly. In this manner the mobile stations do not become synchronized to receive the same OMT.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a cellular communications network, comprising the steps of:

providing a set of mobile stations that are capable of operating in an idle sleep mode of operation;

transmitting a forward control channel to the set of mobile stations, the forward control channel being organized as a frame structure that is continuously repeated, each frame structure being comprised of an overhead information portion and a plurality of paging information portions; and operating the set of mobile stations in synchronism to all receive the overhead information portion only from every nth frame structure and to receive an assigned one of the paging information portions from every frame structure, wherein n is an integer that is greater than one.

2. A method as set forth in claim 1, and further comprising a step of placing individual ones of the set of mobile stations into a low power mode of operation when not receiving the overhead information and paging information portions.

3. A method as set forth in claim 1, wherein the value of n is fixed.

4. A method as set forth in claim 1, wherein the value of n is a variable.

5. A method as set forth in claim 1, wherein the value of n is equal to six.

6. A method as set forth in claim 1, wherein the overhead information portion is comprised at least of a system parameter overhead message, and every nth overhead message portion includes a synchronization message.

7. A method as set forth in claim 6, wherein the synchronization message is a registration increment Global Action Overhead Message (GAOM) having an Idle Sleep Mode (ISM) field set to "1".

8. A mobile station operable for communicating with a base station, comprising:

means for placing said mobile station in an idle sleep mode of operation;

means for receiving a forward control channel from the base station, the forward control channel being organized as a frame structure that is continuously repeated, each frame structure being comprised of an overhead information portion and a plurality of paging information portions; and means for operating said mobile station to exit the idle sleep mode of operation to receive, in synchronism with all other idle sleep mode mobile stations that communicate with the base station, the overhead information portion only from every nth frame structure and to receive an assigned one of the paging information portions from every frame structure, wherein n is an integer that is greater than one.

9. A mobile station as set forth in claim 8, wherein the value of n is fixed.

10. A mobile station as set forth in claim 8, wherein the value of n is a variable.

11. A mobile station as set forth in claim 8, wherein the value of n is equal to six.

12. A mobile station as set forth in claim 8, wherein the overhead information portion is comprised at least of a system parameter overhead message and every nth overhead message portion includes a synchronization message.

13. A mobile station as set forth in claim 12, wherein the synchronization message is a registration increment Global Action Overhead Message (GAOM) having an Idle Sleep Mode (ISM) field set to "1".

14. A method for operating a cellular communications network, comprising the steps of:

provinding a set of mobile stations that are capable of operating in an idle sleep mode of operation;

transmitting a forward control channel to the set of mobile stations, the forward control channel being organized as a frame structure that is continuously repeated, each frame structure being comprised of an overhead information portion and a plurality of paging information portions; and operating the set of mobile stations to all receive the overhead information portion only from every nth frame structure and to receive an assigned one of the paging information portions from every frame structure, wherein n is an integer that is greater than one, wherein at least some of the mobile stations receive an mth overhead message portion after receiving an idle sleep mode synchronization message and then synchronize to receive only every nth overhead information portion.

15. A method as set forth in claim 14, wherein the value of n and m are both fixed.

16. A method as set forth in claim 14, wherein at least one of the values of n and m is variable, and is transmitted to the mobile stations over the forward control channel.

* * * * *